(12) United States Patent
Kara

(10) Patent No.: US 6,670,583 B2
(45) Date of Patent: Dec. 30, 2003

(54) HEATED CUP HOLDER SYSTEM

(75) Inventor: S. Levent Kara, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/248,821

(22) Filed: Feb. 21, 2003

(65) Prior Publication Data

US 2003/0155345 A1 Aug. 21, 2003

(30) Foreign Application Priority Data

Feb. 21, 2002 (EP) ............................................. 02100161

(51) Int. Cl.[7] .......................... A47J 36/24; H01H 36/00; H01R 11/30
(52) U.S. Cl. ........................ 219/432; 219/435; 219/436; 439/39
(58) Field of Search ................................ 219/432, 385, 219/386, 429, 435, 436; 439/39

(56) References Cited

U.S. PATENT DOCUMENTS

| | | | |
|---|---|---|---|
| 3,706,882 A | * 12/1972 | Eby | .............................. 439/39 |
| 3,915,079 A | 10/1975 | Balderson | |
| 4,112,941 A | * 9/1978 | Larimore | ...................... 439/39 |
| 4,523,083 A | * 6/1985 | Hamilton | ..................... 219/433 |
| 5,829,987 A | 11/1998 | Fritsch et al. | |
| 6,121,585 A | 9/2000 | Dam | |
| 6,314,867 B1 | 11/2001 | Russell | |

FOREIGN PATENT DOCUMENTS

| | | |
|---|---|---|
| DE | 19930642 A1 | 7/1999 |
| FR | 2766258 | 7/1997 |

* cited by examiner

Primary Examiner—Joseph Pelham
(74) Attorney, Agent, or Firm—Michael A. Schaldenbrand

(57) ABSTRACT

The invention relates to a heatable cup system, comprising a cup (1) and a cup holder (2), that is suitable, for example, for attachment to a console of a motor vehicle. The cup (1) and the cup holder (2) have corresponding, electric contacts (4, 5) for the supply of current to a heating element (3) in the base of the cup (1). The electric contacts of the cup holder (2) are mounted moveably and are designed as magnets (5), in order to produce a contact assisted by magnetic force.

11 Claims, 1 Drawing Sheet

HEATED CUP HOLDER SYSTEM

BACKGROUND OF THE INVENTION

1. Technical Field

The invention relates generally to a heated cup holder system, containing a cup having an electric heating element and having electric contacts for the supply of current to the heating element, and a cup holder having electric contacts for the supply of current to the cup. The invention furthermore relates to a cup and a cup holder for a system of this type.

2. Background of the Invention

U.S. Pat. No. 6,121,585 discloses a system having a cup and an associated cup holder that can be used, for example, in a motor vehicle. In this case, the cup contains a heating element having a PTC resistor (PTC: positive temperature coefficient), and two electric contacts, which are placed on the underside of the cup, for the supply of current to the heating element. At positions corresponding thereto, the cup holder has electric contacts which are designed as spring elements. When the cup is inserted into the cup holder, the corresponding electric contacts come into contact, which supplies current to the heating element and therefore controls heating of the cup. However, the disadvantage of a system of this type is that the contact-making between the electric contacts takes place only in a pointwise manner, so that if the cup sits slightly obliquely in the cup holder, the contact may be interrupted. Furthermore, the relatively high current flow at the contact points may result in undesirable heating at them.

It would therefore be desirable to provide a heatable cup system that permits greater functional reliability and more efficient heating operation.

SUMMARY OF THE INVENTION

The present invention provides a heated cup and cup holder system.

In one aspect of the invention, a heated cup system is disclosed. This system comprises a cup that includes an electric heating element. This system further comprises a first set of electrical contacts associated with the cup and operatively coupled to the electric heating element. The system also comprises a cup holder and a second set of electrical contacts associated with the cup holder. The second set of electrical contacts is attracted to the first set of electrical contacts by a magnetic force. When the cup holder receives the cup in a mated position, the first set of electrical contacts and the second set of electrical contacts form a connection, and the magnetic force facilitates the forming of this connection.

In another aspect of the invention, one or more of the sets of electrical contacts in the system described above is movably mounted.

One advantage of the invention is that the magnetic force operating on the electrical contacts assists in forming a good electrical connection between them. Another advantage of the invention is that a good electrical connection between the electrical contacts is ensured, even in cases where the cup and cup holder do not obtain the optimal mating position, by allowing the electrical contacts to move in relation to the cup and cup holder, i.e., the electrical contacts being moveably mounted.

Other advantages and features of the present invention will become apparent when viewed in light of the detailed description of the preferred embodiment when taken in conjunction with the attached drawings and appended claims.

DETAILED DESCRIPTION

The heatable cup system according to the invention contains a cup having an electric heating element that may, for example—in a similar manner to U.S. Pat. No. 6,121,585—be a PTC resistor. In order to ensure a supply of current, the heating element is connected to contacts situated on the outside of the cup. Furthermore, the cup system contains a cup holder corresponding to the cup and having electric contacts for the supply of current to the cup. The electric contacts of the cup and the cup holder may both, or individually, be mounted moveably. Furthermore, the electric contacts of the cup and the cup holder are attracted by magnetic forces when the cup is being inserted into the cup holder and into the mating position.

By virtue of the fact that, in the cup system described, at least one of the contacts of a pair of contacts of cup and cup holder is moveable and that the two contacts are attracted by magnetic forces, good contact is ensured at all times. Because of the moveability of the at least one contact, the connection is robust to variations in the cup position relative to the cup holder. Furthermore, the adhesion between the contacts, which is brought about by the magnetic forces, permits the contacts to be able to make contact in one surface area, so that a large cross section is provided for a loss-free transfer of current. Additionally, the magnetic force also contributes considerably to better mechanical fixing of the cup in the cup holder.

A cup suitable for the heatable cup system contains an electric heating element and electric contacts for the supply of current to the heating element, the electric contacts being designed as magnets or consisting of a magnetizable material. Furthermore, the electric contacts may be mounted moveably in order to be able to compensate for tolerances in the relative positioning of cup and cup holder when put together.

Furthermore, a cup holder suitable for the heatable cup system has electric contacts for the supply of current to the cup, these electric contacts being designed as magnets or consisting of a magnetizable material. Furthermore, the electric contacts can be mounted moveably in order to be able to compensate for tolerances in the relative positioning of cup and cup holder when put together.

The heatable cup system which has been described is advantageously used in a motor vehicle. In this case, the supply of current necessary for heating can be taken from the electric supply system of the motor vehicle. Furthermore, the cup holder is preferably arranged in a fixed manner at a suitable location on the console.

Figure 1:
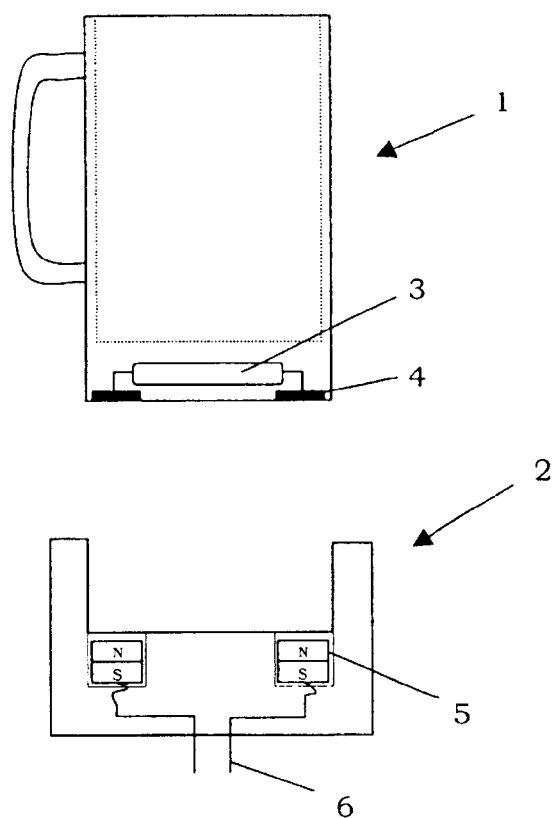
FIG. 1 shows a heatable cup system according to the present invention.

FIG. 1 shows, in a cross section, a cup 1 in which a liquid to be heated, for example tea or coffee, can be situated. The cup 1 contains, in its base, a heating element 3 which is connected via electric lines to contacts 4 exposed on the underside of the cup.

FIG. 1 furthermore shows, in cross section, a cup holder 2 which has a depression corresponding to the cup 1 in order to be able to receive the cup 1 and fix it mechanically in place. Furthermore, the cup holder 2 has electric supply lines 6 for the supply of current to the heating element 3, the supply lines ending in two electric contacts exposed on the base of the cup holder 2. These electric contacts are designed as magnets 5 and are mounted moveably with a certain amount of play in the vertical direction and, if appropriate, also in the horizontal direction. The moveable mounting of the contacts 5 can take place, for example, in a similar manner to that described in DE 199 30 642 A1.

When the cup 1 is inserted into the cup holder 2, its electric contacts 4 come to lie above the electric contacts 5 of the cup holder. Since the electric contacts 4 of the cup 1 are to consist of a magnetizable material, for example iron, or are even themselves magnets, the electric contacts 4 of cup 1 and the electric contacts 5 of cup holder 2 will be magnetically attracted to each other. This magnetic attraction will facilitate physical contact of the electric contacts 4 of cup 1 and the electric contacts 5 of cup holder 2, thus leading to better electrical connection between them. As a rule, a movement of the moveable contacts 5 of the cup holder 2 takes place in this case, said movement compensating for possible differences in positioning.

The contact which is brought about and assisted by a magnetic force therefore has the advantage that it is robust to tolerances in the relative position of cup and cup holder, that it permits a low-loss contact between the contact surfaces, and that it additionally contributes to a mechanical fixing in place of the cup 1 on the cup holder.

If the contacts 4 of the cup 1 are designed as magnets, the cup can thereby also be deposited in a mechanically stable manner onto magnetizable underlying surfaces. Furthermore, in this case the repulsion of like poles can be used in order to eliminate certain contact pairings of cup 1 and cup holder 2. In this case, an electric contact is only produced if contacts 4, 5 having opposite poles lie opposite each other.

Figure 2:
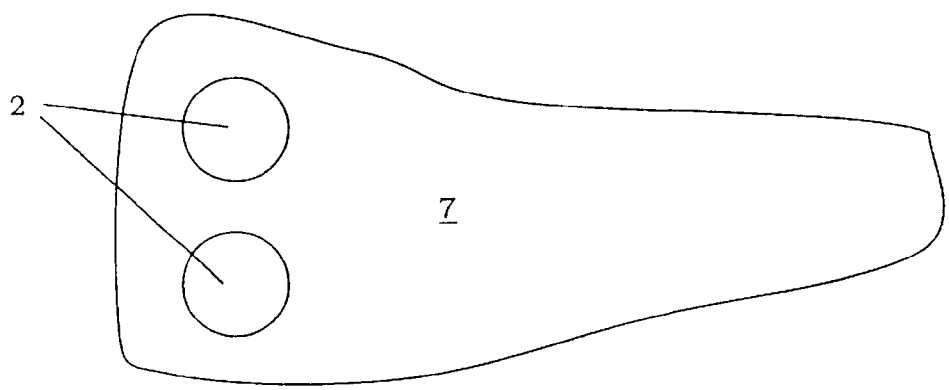
FIG. 2 shows a plan view of the console of a motor vehicle with cup holders integrated therein according to the present invention.

FIG. 2 shows, schematically, the plan view of the console 7 of a motor vehicle, in which two cup holders 2, which are designed according to the invention, are arranged. However, cup holders may also be arranged at different positions, such as the inside of the flap of the glove compartment or on the rear side of the backrests of the front seats, the last-mentioned case enabling them to be used by people on the rear seats.

While particular embodiments of the invention have been shown and described, numerous variations and alternate embodiments will occur to those skilled in the art. Accordingly, it is intended that the invention be limited only in terms of the appended claims.

What is claimed is:

1. A heated cup system comprising:
   a cup, said cup comprising an electric heating element,
   a first set of electrical contacts associated with said cup, said first set of electrical contacts being operatively coupled to said electric heating element,
   a cup holder, and
   a second set of electrical contacts associated with said cup holder, said second set of electrical contacts being attracted to said first set of electrical contacts by a magnetic force,
      wherein said first set of electrical contacts and said second set of electrical contacts form a connection when said cup holder receives said cup in a mated position, said magnetic force facilitating said connection.

2. The system of claim 1, wherein said first set of electrical contacts is moveably mounted to said cup.

3. The system of claim 2, wherein said first set of electrical contacts comprises magnets.

4. The system of claim 2, wherein said first set of electrical contacts comprises magnetizable material.

5. The system of claim 2, wherein said second set of electrical contacts comprises magnets.

6. The system of claim 2, wherein said second set of electrical contacts comprises magnetizable material.

7. The system of claim 1, wherein said second set of electrical contacts is moveably mounted to said cup holder.

8. The system of claim 7, wherein said first set of electrical contacts comprises magnets.

9. The system of claim 7, wherein said first set of electrical contacts comprises magnetizable material.

10. The system of claim 7, wherein said second set of electrical contacts comprises magnets.

11. The system of claim 7, wherein said second set of electrical contacts comprises magnetizable material.

* * * * *